(12) United States Patent
Fukumori et al.

(10) Patent No.: US 11,628,444 B2
(45) Date of Patent: Apr. 18, 2023

(54) HUSKING ROLL ABNORMALITY DETERMINATION DEVICE OF RICE HUSKER AND RICE HUSKER USING THE SAME

(71) Applicant: SATAKE CORPORATION, Tokyo (JP)

(72) Inventors: Takeshi Fukumori, Tokyo (JP); Sumio Tagawa, Tokyo (JP); Minoru Koreda, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 844 days.

(21) Appl. No.: 16/489,826

(22) PCT Filed: Dec. 25, 2017

(86) PCT No.: PCT/JP2017/046486
§ 371 (c)(1),
(2) Date: Aug. 29, 2019

(87) PCT Pub. No.: WO2018/159084
PCT Pub. Date: Sep. 7, 2018

(65) Prior Publication Data
US 2020/0114365 A1 Apr. 16, 2020

(30) Foreign Application Priority Data
Mar. 2, 2017 (JP) .............................. JP2017-039584

(51) Int. Cl.
*B02B 7/00* (2006.01)
*B02B 3/04* (2006.01)
*G01M 13/00* (2019.01)

(52) U.S. Cl.
CPC .................. *B02B 7/00* (2013.01); *B02B 3/04* (2013.01); *G01M 13/00* (2013.01)

(58) Field of Classification Search
CPC ............. B02B 7/00; B02B 3/04; G01M 13/00
(Continued)

(56) References Cited

U.S. PATENT DOCUMENTS

2002/0011155 A1 1/2002 Houri et al.
2016/0107162 A1 4/2016 Busenhart et al.

FOREIGN PATENT DOCUMENTS

CN 1327887 A 12/2001
CN 105473232 A 4/2016
(Continued)

OTHER PUBLICATIONS

The Notification of the First Office Action dated Sep. 23, 2020 in Chinese Patent Application No. 201780087685.X (7 pages) with an English translation (9 pages).

*Primary Examiner* — Brent T O'Hern
(74) *Attorney, Agent, or Firm* — Faegre Drinker Biddle & Reath LLP (57) ABSTRACT

A rice husker includes a pair of husking rolls. One of the pair of husking rolls is attached to a main shaft and the other of the pair of husking rolls is attached to an auxiliary shaft movable to be close to and away from the main shaft. The rice husker includes abnormality determination means. The abnormality determination means determines that the husking rolls fail to work normally when vibrations having a preset intensity larger than the preset intensity are successively detected by a vibration sensor until a certain time elapses. The certain time is from the start of a husking action to disappearance of distortion on a surface of the husking roll. The vibration sensor is provided on at least either of bearing units of the main shaft and the auxiliary shaft. The vibration sensor detects vibrations occurring due to the husking action by the pair of husking rolls.

6 Claims, 7 Drawing Sheets

(58) Field of Classification Search
USPC .......................................................... 99/486
See application file for complete search history.

(56) References Cited

FOREIGN PATENT DOCUMENTS

| | | | |
|---|---|---|---|
| CN | 205868359 U | | 1/2017 |
| CN | 106362820 A | | 2/2017 |
| JP | H06-15186 A | | 1/1994 |
| JP | H0615186 A | * | 1/1994 |
| JP | H09-122598 A | | 5/1997 |
| JP | 2004-93329 A | | 3/2004 |
| JP | 2014-208321 A | | 11/2014 |
| JP | 2016-64372 A | | 4/2016 |
| JP | 2016-204120 A | | 12/2016 |
| KR | 2011-0067885 A | | 6/2011 |
| WO | WO-2017/022514 A1 | | 2/2017 |

* cited by examiner

FIG. 8

HUSKING ROLL ABNORMALITY DETERMINATION DEVICE OF RICE HUSKER AND RICE HUSKER USING THE SAME

CROSS REFERENCE TO PRIOR APPLICATIONS

This application is the National Stage of International Application No. PCT/JP2017/046486 filed Dec. 25, 2017, and claims benefit of Japanese Application No. 2017-039584 filed on Mar. 2, 2017, which are herein incorporated by reference in their entirety.

TECHNICAL FIELD

The present invention relates to a husker (rice husker) and in particular relates to a husking roll abnormality determination device of a rice husker that determines an abnormality of a husking roll used in the rice husker and to a rice husker using the same device.

BACKGROUND ART

In a rice husker that performs husking of unhusked rice grains using a pair of husking rolls including a high speed roll and a low speed roll, rubber portions of the husking rolls gradually wear in the course of continuation of husking work, causing decrease in the rotation speed of the rolls, which in turn causes degradation of their husking capability, so that the husking rolls are replaced by new ones when the thickness of their rubber portions becomes about 5 millimeters (see Patent Literature 1). In the case of a large rice husker that successively performs hulling work to handle a large amount of unhusked rice grains in an agricultural facility and the like (where the width of the husking rolls is about 10 inches), it is necessary to replace the husking rolls by new ones relatively frequently.

In such replacement of husking rolls, there will be no problem if the new husking rolls have a quality of a predetermined level (the so-called genuine products or the like), but, in Asian countries or the like, it is not unusual to use an inexpensive low-quality husking roll. The inexpensive husking roll is formed by reusing a metallic drum of a used husking roll and arranging an inexpensive rubber material on the circumferential surface of the metallic drum, so that the surface of the husking roll is slightly distorted and in most cases not in a state of a true circle.

Also, by repeatedly using a used husking roll, the opening for attachment of the metal drum of the husking roll brought into fitting engagement with the roll attachment body of the rice husker wears, making it difficult to perform accurate positioning (centering).

As a result, when the above-described inexpensive husking roll (hereinafter referred to as a "recycled roll") is used, a phenomenon of vibration about an auxiliary shaft fulcrum shaft on the side of the movable roll (low speed roll) (the so-called "whirling") occurs at the start of the hulling operation, which may lead to decrease in the husking ratio and creation of broken rice grains, and may further lead to cracks and destruction of the husking unit or the like.

In the meantime, the above-described recycled rolls vary in their qualities, and as the distortion of the rubber portion and irregularities on the surface of some of them may wear as a result of continued hulling operation for a predetermined period of time, the above-described whirling phenomenon may gradually disappear, and they may be thereafter used normally.

CITATION LIST

Patent Literature

[Patent Literature 1]
Japanese Patent Laid-Open No. 2014-208321

SUMMARY OF INVENTION

Technical Problem

In view of the above-identified problems, an object of the present invention is to provide a husking roll abnormality determination device of a rice husker and a rice husker using the same device in which only a husking roll exhibiting a continued whirling phenomenon after a lapse of a predetermined period of time since the start of hulling operation is determined as failing to work normally.

Solution to Problem

In order to achieve the above-identified object, a rice husker in accordance with an embodiment of the present invention includes a pair of husking rolls, wherein one of the pair of husking rolls is attached to a main shaft and the other of the pair of husking rolls is attached to an auxiliary shaft movable to be close to and away from the main shaft, and includes abnormality determination means that determines that the husking rolls fail to work normally when vibrations having a preset intensity or an intensity larger than the preset intensity are successively detected by a vibration sensor until a certain time elapses, the certain time corresponding to a period of time from the start of a husking action to disappearance of distortion on a surface of the husking roll, wherein the vibration sensor is provided on at least either of bearing units of the main shaft and the auxiliary shaft, the vibration sensor being configured to detect vibrations occurring due to the husking action by the pair of husking rolls.

By using the above-described husking roll abnormality determination device of the rice husker, even in a case where an inexpensive low-quality husking roll is used, an abnormality is only determined when abnormal vibrations do not disappear as a result of being used for a predetermined period of time, so that it is made possible to prevent creation of a large amount of rice grains failing to be husked and/or broken rice grains due to long-term use of a husking roll whose roundness or the like is considerably defective and prevent creation of cracks or destruction of the husking unit or the like due to vibrations.

In the above-described rice husker, the time corresponding to the period until the distortion on the surface of the above-described husking roll disappears is preferably set to 60 to 180 minutes. By virtue of this, since the time for the vibrations to disappear is set to 60 to 180 minutes, the above-described time can be specified as appropriate depending on the actual situations in the countries and regions.

Also, the above-described rice husker may include forced stoppage means that forcibly terminates husking work when the abnormality determination means of the above-described husking roll abnormality determination device determines that the husking roll fails to work normally.

Advantageous Effect of Invention

According to the present invention, it is made possible to provide a husking roll abnormality determination device of a rice husker and a rice husker using the same device in which only a husking roll exhibiting a continued whirling phenomenon after a lapse of a predetermined period of time since the start of the hulling operation is determined as failing to work normally.

DESCRIPTION OF EMBODIMENT

Figure 1:
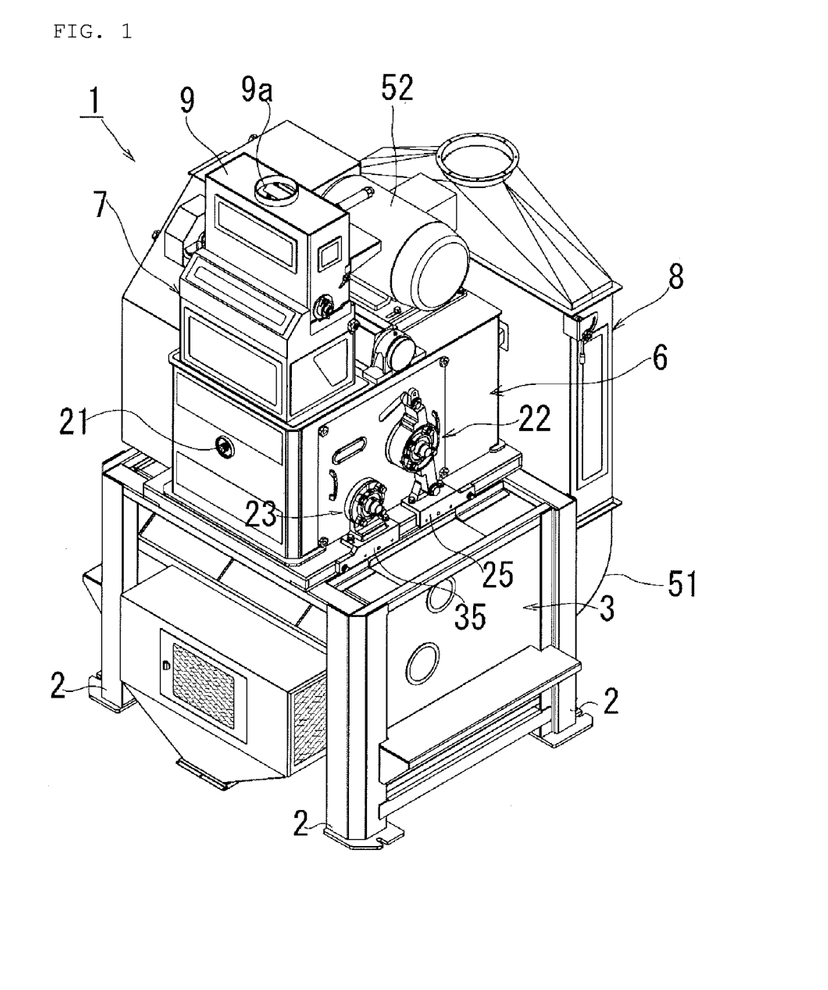
FIG. 1, which gives the full picture of a rice husker in accordance with an embodiment of the present invention, is a perspective view thereof with its husking unit depicted in an exposed state.

An embodiment of the present invention will be described hereinbelow with reference to the drawings. FIG. 1 is a perspective view which gives the full picture of the rice husker in accordance with the embodiment of the present invention (where no husking roll is mounted), FIG. 2 is a schematic vertical cross-sectional view which illustrates the internal structure of the same device (where a husking roll is mounted), and FIG. 3 is a rear view which depicts the arrangement of belts in the same device.

<Overview of the Rice Husker>

Figure 2:
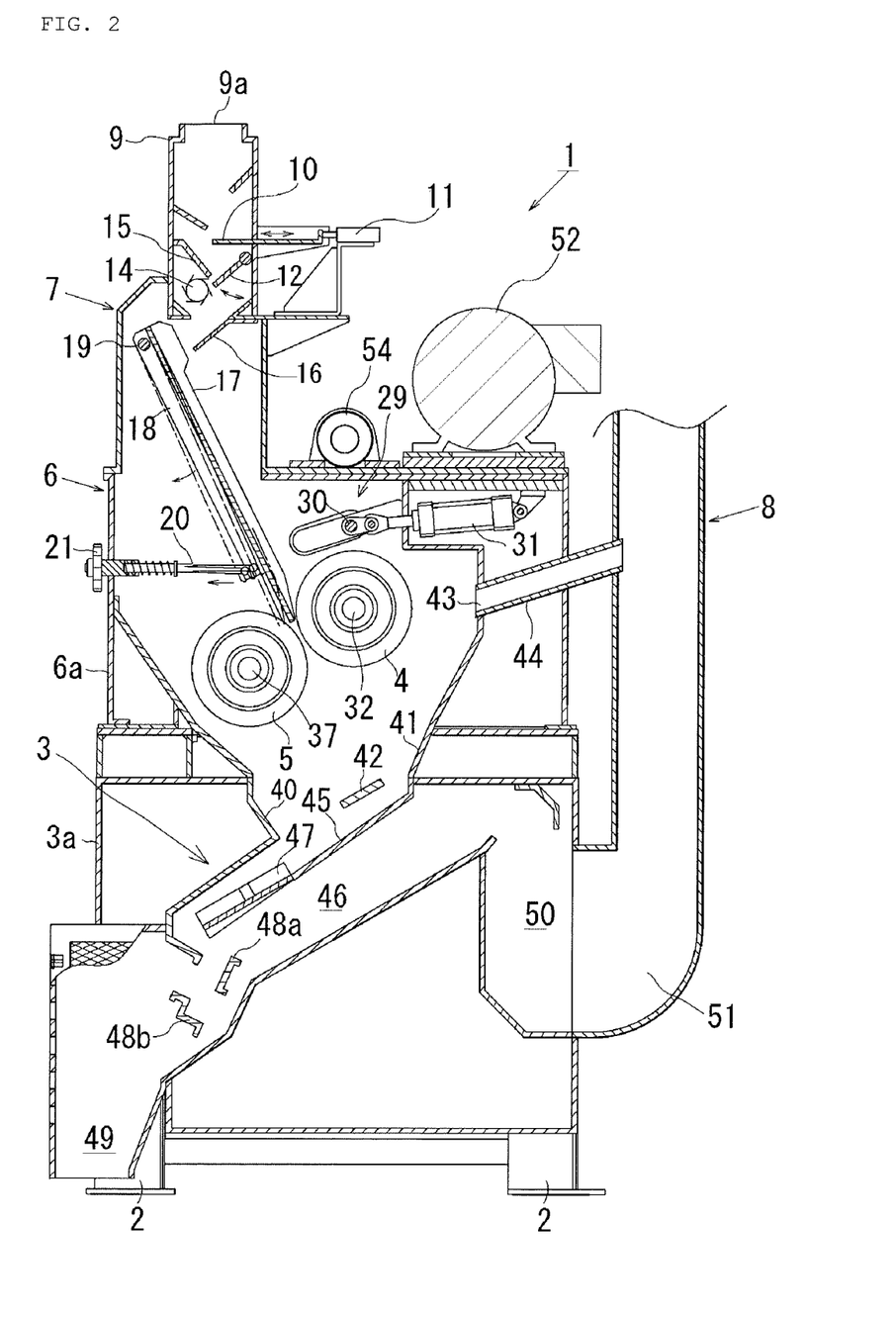
FIG. 2 is a schematic front vertical cross-sectional view illustrating an internal structure of the same device.
Figure 3:
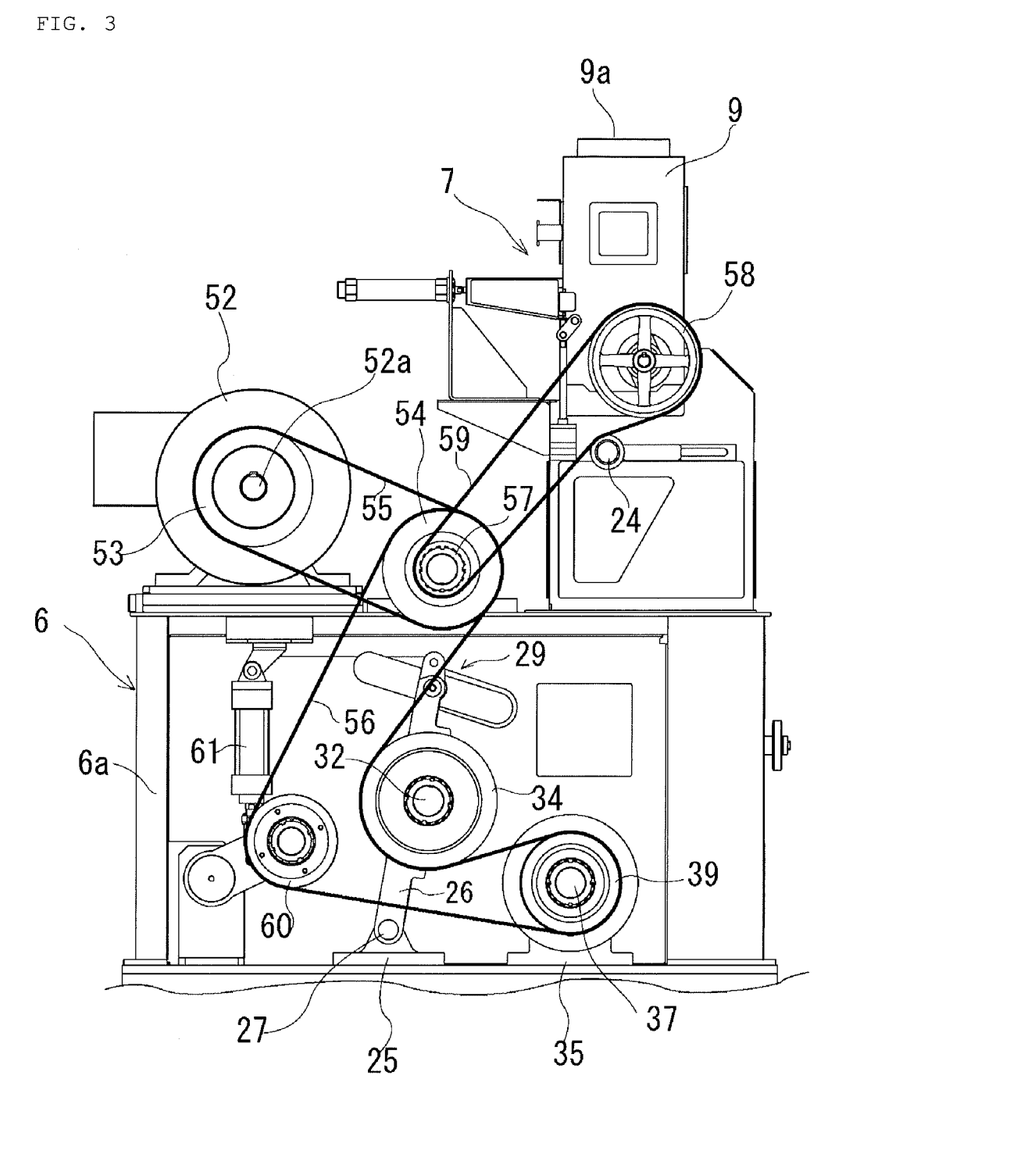
FIG. 3 is a rear view illustrating pulleys of the same device and arrangement of belts between the pulleys.

As illustrated in FIGS. 1 to 3, the principal components of a rice husker 1 includes a winnowing unit 3 that performs selection of husked rice grains in a winnowing channel defined inside a housing supported by a plurality of columns 2; a husking unit 6 that is placed on an upper portion of the winnowing unit 3 and configured by arranging a pair of husking rolls 4 and 5 made of rubber rolls one of which is supported on a fixed bearing and the other of which is supported by a movable bearing that is movable so as to be close to and away from the fixed bearing, where the husking rolls 4 and 5 are rotated at speeds of rotation different from each other and in a reverse direction relative to each other (inwardly), respectively; a raw material supply unit 7 that is placed on an upper portion of the husking unit 6 and configured to store unprocessed rice grains from which husks are not removed, and supply the unprocessed rice grains with husks to the above-described husking unit 6; and an aspirator 8 that is installed at one sides of the above-described winnowing unit 3 and the above-described husking unit 6 and configured to aspirate and remove, by a force of wind, foreign matters and contaminants or the like having a small specific gravity such as rice husks winnowed by the above-described winnowing unit 3.

<Raw Material Supply Unit>

Figure 4:
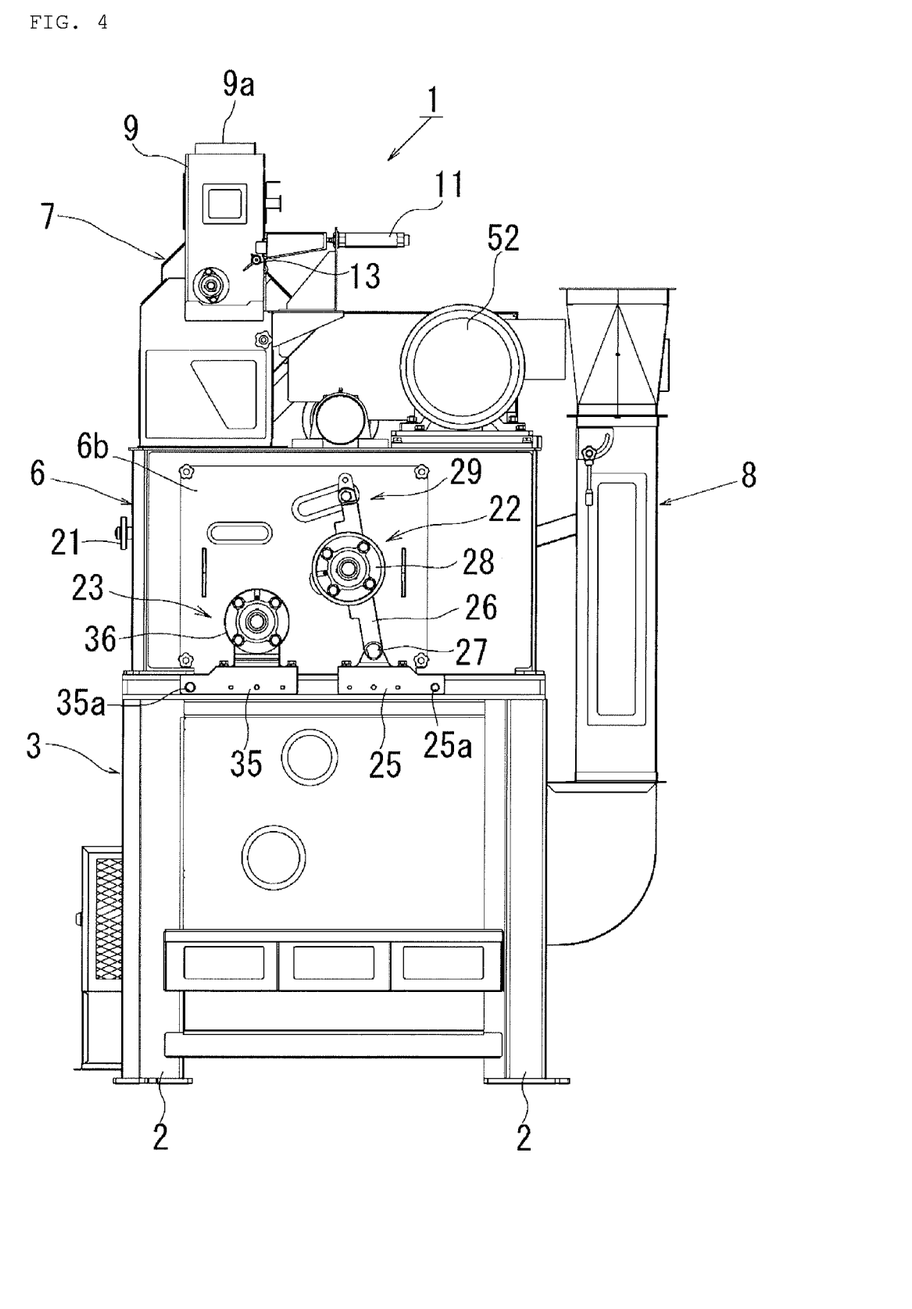
FIG. 4 is a front view of the same device with its husking unit depicted in an exposed state (where no husking roll is mounted).

As illustrated in FIG. 2, a raw material storage unit 9 is provided in the above-described raw material supply unit 7, unprocessed rice grains with husks input via a raw material supply port 9a can be stored in the upper portion of the raw material storage unit 9, and a shutter 10 is provided at an intermediate portion of the storage unit 9, where the shutter 10 is configured to input or shut off the unprocessed rice grains with husks stored in the storage unit 9 into or from the machine. Opening and closing of the shutter 10 is controlled through control of activation and deactivation of an air cylinder 11 provided at one side of the storage unit 9. A flow rate adjustment valve 12 is provided below the shutter 10. As illustrated in FIG. 4, the degree of opening of the flow rate adjustment valve 12 can be adjusted by turning an adjustment knob 13.

As means for feeding unprocessed rice grains with husks to a guide chute which will be described later, a feeding roll 14 that is rotated as appropriate by drive means is provided below the above-described flow rate adjustment valve 12. In addition, the bridge is forced to collapse by the feeding roll 14 being rotated between the flow rate adjustment valve 12 and a shelf 15 provided so as to face the valve 12, making it possible to convey the unprocessed rice grains with husks at a constant flow rate to the husking unit 6 below. In addition, a supply gutter 16 is provided which supplies the unprocessed rice grains with husks falling from the above-described feeding roll 14 to the guide chute which will be described later.

A guide chute 17 for feeding the unprocessed rice grains with husks falling from the above-described feeding roll 14 into the space between the husking rolls 4 and 5 of the husking unit 6 is provided at a predetermined angle of inclination below the tip of the above-described supply gutter 16. The guide chute 17 is fixed to and held by a chute frame 18, the upper end of the chute frame 18 is attached to a support shaft 19 so that it is rotatable about the support shaft 19 while the lower end of the chute frame 18 is brought into fitting engagement with an adjustment rod 20, and the angle of inclination of the guide chute 17 is adjusted by rotating a handle 21 provided outside the machine. The width of the above-described guide chute 17 is substantially equal to that of the above-described pair of husking rolls 4 and 5.

It should be noted that, when a line that connects the extended line from the lower end of the above-described guide chute 17 and the central axis of rotation of the above-described pair of husking rolls 4 and 5 is defined to be substantially perpendicular, then the unprocessed rice grains with husks will be less likely to be hit by the pair of husking rolls 4 and 5 that are rotating and disturb the attitude of the unprocessed rice grains with husks, the unprocessed rice grains are orderly supplied into the gap between the husking rolls 4 and 5 in layers of one or two grains, which makes it possible to obtain the effect of suppression of creation of broken rice grains.

<Husking Unit>

The above-described husking unit 6 includes a movable bearing 22 that rotates the one husking roll 4 so as to be free to be close and distant (in the left-to-right direction on the drawing sheet of FIG. 4) and a fixed bearing 23 that supports the other husking roll 5, where the husking rolls 4 and 5 each have a structure allowing rotation at speeds of rotation different from each other and inwardly relative to each other. The above-described movable bearing 22 is constituted by a roll open/close link 26 that extends upward so as to be rotatable via a seat unit 25, a support shaft 27 provided at a lower end of the roll open/close link 26, a bearing unit 28 provided at an intermediate portion of the above-described roll open/close link 26, and a roll open/close mechanism 29 provided at an upper end of the roll open/close link 26. The above-described roll open/close mechanism 29 is, as illustrated in FIG. 5, constituted by a roll open/close support shaft 30 at an upper end of the roll open/close link 26 and a roll open/close cylinder 31 coupled to the roll open/close support shaft 30.

In addition, a husking roll bearing shaft 32 is supported by the bearing unit 28 of the above-described movable bearing 22, the one husking roll 4 is attached to the husking roll bearing shaft 32, and a large diameter pulley 34 is attached to the end of the shaft so as to be driven and rotated by a V-belt 56.

Figure 5:
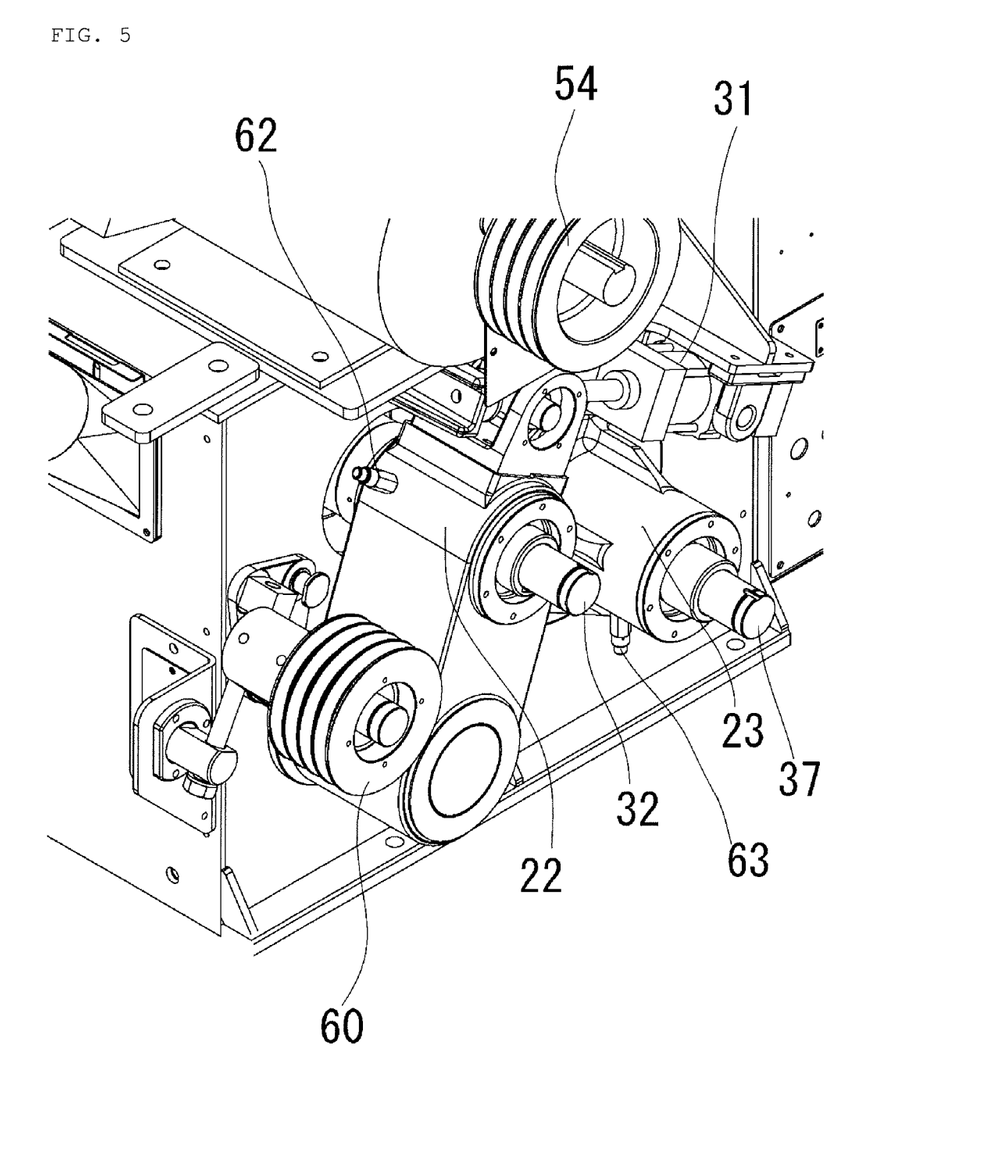
FIG. 5 is an enlarged partial perspective view of the back side of the same device.

It should be noted that, in order to avoid complexity of the drawings, the roll open/close cylinder 31 in FIG. 5 is illustrated in a state where it is provided on the opposite side of the roll open/close cylinder 31 in FIG. 2, but the effect of the roll open/close cylinder 31 opening and closing the roll open/close mechanism 29 is identical.

Meanwhile, in the above-described fixed bearing 23, a husking roll bearing shaft 37 is supported by a bearing unit 36 that extends upward via a seat unit 35. In addition, in the same manner as described above, the other husking roll 5 is attached to the husking roll bearing shaft 37, and a small diameter pulley 39 can be attached to the end of the shaft so as to be driven and rotated by the above-described V-belt 56.

As illustrated in FIG. 2, funnel-shaped grain collection gutters 40, 41 are provided at a lower portion inside of a housing 6*a* of the husking unit 6 and, below the grain collection gutters 40, 41, a buffer plate 42 for absorbing the impact by making the rubbed and fallen rice grains collide therewith are provided immediately below the above-described husking rolls 4 and 5, where the buffer plate 42 is provided so as to extend over the entire widths of the husking rolls 4 and 5. Also, a suction port 43 that sucks dust or the like soaring in the course of the husking process is provided on one side wall at an upper portion inside the above-described housing 6*a*, and the suction port 43 is brought into communication with the aspirator 8 via a suction pipe 44.

<Winnowing Unit>

A downwardly sloping flow-down passage 45 that guides rubbed and fallen rice grains which fall under the husking action by the above-described pair of husking rolls 4 and 5 is provided inside a housing 3*a* of the above-described winnowing unit 3, and an upwardly sloping winnowing passage 46 that performs winnowing of the rubbed and fallen rice grains flowing down from the flow-down passage 45 is provided adjacent to and immediately below the above-described flow-down passage 45. An equal divider 47 for enlarging the width of the flow channel of the rubbed and fallen rice grains flowing down in the flow-down passage 45 is provided inside the above-described flow-down passage 45, and a plurality of rectification plates 48*a*, 48*b* are arranged in the above-described winnowing passage 46 for causing the brown rice grains among the falling husked rice grains to fall downward such that they are not sucked to the downstream side of the winnowing passage 46, and a milled item discharge passage 49 that discharges mixed grains comprising the brown rice grains which will become the milled items after the careful selection of the falling husked rice grains and the rice husks that were not husked to the outside of the machine is further provided at the lower end of the sloping of the above-described winnowing passage 46 while a rice husk discharge passage 50 that conveys rice husks in the falling husked rice grains and other contaminants to the above-described aspirator 8 is connected to the upper end of the same sloping.

<Aspirator>

The aspirator 8 that is connected to the above-described rice husk discharge passage 50 includes a suction air passage 51 having a structure in which air flows upward in the vertical direction, and a suction fan (not shown) for sucking and removing, by a force of wind, rice husks, contaminants, and the like having a small specific gravity is connected to the downstream end of the suction air passage 51.

<Rotary Drive Unit of the Husking Unit>

Next, a rotary drive unit of the husking unit 6 will be described with reference to FIG. 3.

A drive motor 52 is installed on one side on the housing 6*a* of the above-described husking unit 6, and the above-described husking rolls 4 and 5 are rotated and driven by the rotation force of the drive motor 52. More specifically, a V-belt 55 is stretched between a motor pulley 53 attached to a drive shaft 52*a* of the above-described drive motor 52 and a relay pulley 54 arranged at a central portion of the upper portion of the above-described housing 6*a*, and the rotation force from the drive motor 52 is relayed by the above-described relay pulley 54 and then transmitted to the individual units which will be described later.

Specifically, the V-belt 56 is stretched in a cross-coupled manner between the above-described relay pulley 54, the large diameter pulley 34 attached to the bearing shaft 32 of the movable-side husking roll 4, and the small diameter pulley 39 attached to the bearing shaft 37 of the fixed-side husking roll 5, as a result of which the husking rolls 4 and 5 are configured to be rotated at speeds of rotation different from each other and inwardly relative to each other. In addition, by rotating a tension pulley 60 by an air cylinder 61, the tension of the above-described V-belt 56 is adjusted.

A small diameter relay pulley 57 is also attached in a coaxial manner to the above-described relay pulley 54, and a V-belt 59 is stretched between the relay pulley 57 and a feeding roll pulley 58, as a result of which the feeding roll 14 can be constantly rotated. The tension of the above-described V-belt 59 is adjusted by a tension pulley 24.

<Replacement of Husking Rolls 22>

As the above-described husking rolls 4 and 5 wear due to the husking work, the husking ratio will gradually decrease and accordingly the husking rolls 4 and 5 are replaced as appropriate by new ones. In the replacement of the husking rolls 4 and 5, the seat units 25 and 35 that support the movable bearing 22 and the fixed bearing 23, respectively, are pulled to the front side along with the guide shafts 25*a* and 35*a* extending through the seat units 25 and 35, respectively, and the bearing units 28 and 36 of the movable bearing 22 and the fixed bearing 23 are taken out of the husking roll bearing shafts 32, 37 and, subsequently, the above-described seat units 25 and 35 are rotated in a tulip-like fashion about the above-described guide shafts 25*a* and 35*a*, and thereby the above-described bearing units 28 and 36 are moved away from each other and the husking rolls 4 and 5 are sequentially removed from the husking roll bearing shafts 32, 37 and replaced by new husking rolls.

<Vibration Sensor 22>

FIG. 5 is a perspective view of the back side of the husking unit 6, which is illustrated in a state where the large diameter pulley 34 attached to the movable-side bearing shaft 32, the small diameter pulley 39 attached to the fixed-side bearing shaft 37, and the V-belts 55, 56, and 59 are not mounted thereto. A vibration sensor 62 is screwed onto and attached to the movable bearing 22 of the above-described movable-side bearing shaft 32 so as to be oriented substantially in the horizontal direction. The above-described vibration sensor 62 is a typical vibration meter capable of measuring the magnitude of the vibration at the movable bearing 22 (vibration speed and displacement), which can be selected as appropriate from among various types of vibration meters. Also, in this embodiment, although a vibration sensor 63 is also screwed onto and attached to the fixed bearing 23 so as to be oriented downward (vertical direction), such a sensor may be provided only on the side of the above-described movable bearing 22.

Figure 7:
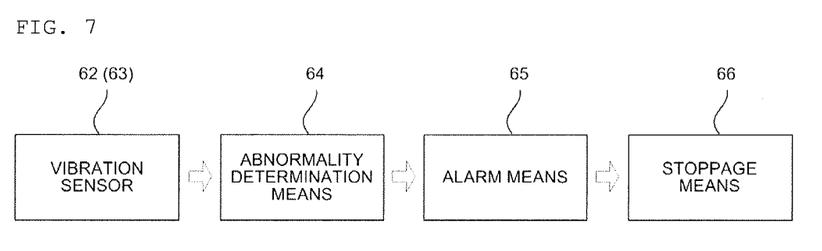
FIG. 7 is a block diagram illustrating an abnormality determination device of a rice husker in accordance with an embodiment of the present invention.
Figure 8:
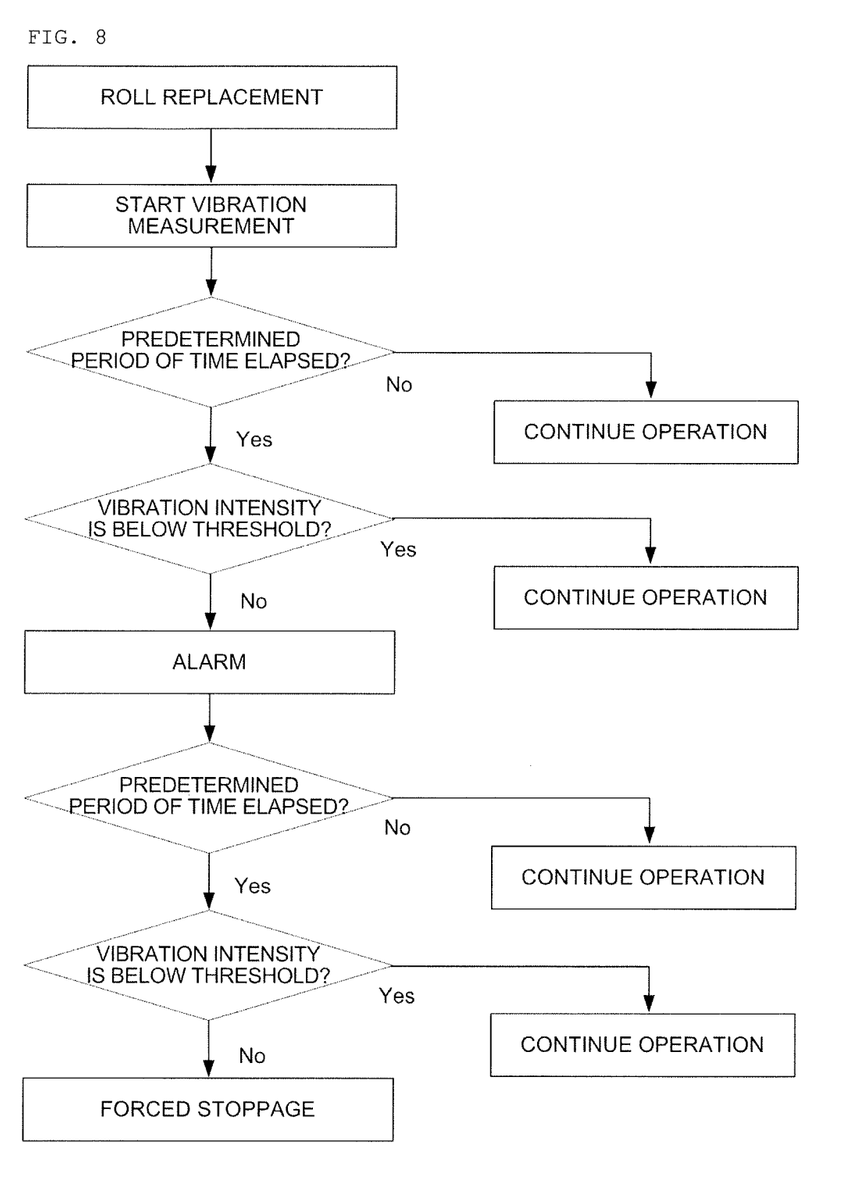
FIG. 8 is a flowchart of the above-mentioned device.

The above-described vibration sensors 62 and 63 are connected to abnormality determination means 64 via signal processing means (not shown) (see FIG. 7). The above-described abnormality determination means 64 carries out abnormality determination on the basis of the vibration data of the vibration speed and displacement detected by the above-described vibration sensors 62 and 63 (see FIG. 8). In addition, the above-described abnormality determination means 65 is connected to alarm means 65, and the alarm means 65 is in turn connected to forced stoppage means, where the alarm means 65 is configured to issue notification about occurrence of an abnormality by a lamp, speaker, and the like when it has been determined by the above-described abnormality determination means 65 that the abnormality exists, and the forced stoppage means is configured to drive the roll open/close cylinder 31 to move the movable bearing 22 so as to move the movable-side husking roll 4 away from the fixed-side husking roll 5 and thereby forcibly terminate the husking work when the above-described abnormality notification state continues for a predetermined period of time.

It should be noted that the above-described forced stoppage means may be configured to cause emergency stoppage of the drive motor 52 that rotates the husking rolls 4 and 5 and drive the air cylinder 11 to close the shutter 10.

Here, the vibration speed which occurs during the husking work by the husking rolls in a normal state where the rubber surfaces of the husking rolls have no irregularities is equal to or less than 15 mm/s (displacement of 0.3 mm), which has been confirmed by experimentation.

Figure 6:
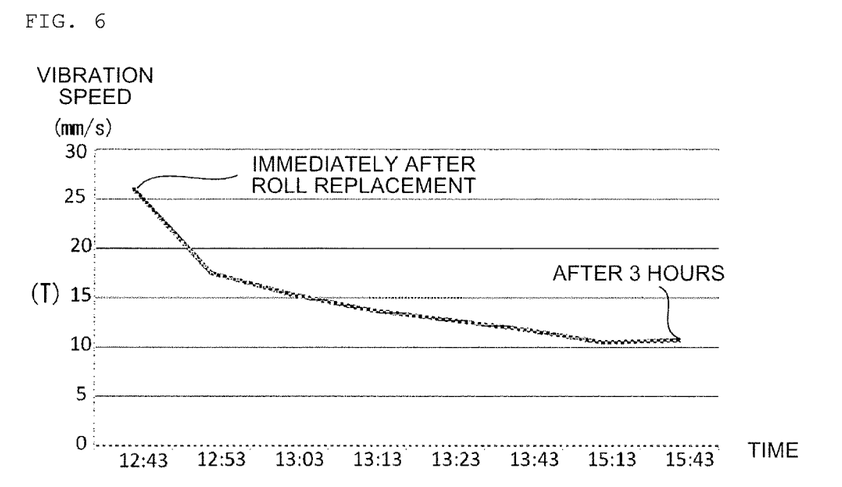
FIG. 6 is a diagram showing the speed of vibration in three hours after replacement of the roll detected by a vibration sensor attached to a movable bearing.

Meanwhile, in a ten-inch rice husker to which recycled rolls are mounted, in a case where the fixed-side bearing shaft 37 is rotated by 1,200 revolutions per minute and the movable-side bearing shaft 32 is rotated by 900 revolutions per minute and the unprocessed rice grains with husks (long-grain type) are supplied at a flow rate of five tons per hour and the husking operation of the rice husker 1 is started, as illustrated in FIG. 6, the vibration speed (intensity of vibration) immediately after the start of the operation is 26 mm/s and the husking ratio at this point was 83.2% and the broken rice ratio was 16.4%. In addition, when one hour elapsed since the start of the operation, the vibration speed decreased to 11.8 mm/s and the husking ratio at this point was 90.9% and the broken rice ratio was 16.0%, and, further, when two hours and 30 minutes elapsed since the start of the operation, the vibration speed decreased to 10.5 mm/s, the husking ratio at this point was 92.1% and the broken rice ratio was 15.6%, and the vibration speed after three hours since the start of the operation was 10.7 mm/s.

In view of this, it will be appreciated that even in the case of the so-called recycled rolls, the vibration gradually decreases after a lapse of one hour since the roll replacement and the start of the husking operation with some of the rolls, and the husking action will become stable.

Based on the above-described knowledge, in the above-described abnormality determination means 64, settings are made such that the vibration speed 15 mm/s is regarded as the upper threshold T, the threshold T is compared with the vibration detection values of the vibrations detected by the above-described vibration sensors 62 and 63, and it is determined that an abnormality exists if the above-described vibration speed is continuously equal to or larger than 15 mm/s for one hour in the shortest case and for three hours in the longest case.

It should be noted that settings may also be made such that it is determined that an abnormality exists if displacement in place of the above-described vibration speed is equal to or larger than 0.3 mm.

INDUSTRIAL APPLICABILITY

The present invention is a rice husker that uses rubber roll type husking rolls and in particular is useful, in countries and regions where recycled rolls are usually used, to prevent degradation of the quality of product brown rice grains and damage accidents of the same machine due to long-term use of degraded husking rolls.

REFERENCE SIGNS LIST

1 rice husker
2 column
3 winnowing unit
4 husking roll
5 husking roll
6 husking unit
7 raw material supply unit
8 aspirator
9 raw material storage unit
10 shutter
11 air cylinder
12 flow rate adjustment valve
13 adjustment knob
14 feeding roll
15 shelf
16 supply gutter
17 guide chute
18 chute frame
19 support shaft
20 adjustment rod
21 handle
22 movable bearing
23 fixed bearing
25 seat unit
26 roll open/close link
27 support shaft
28 bearing unit
29 roll open/close mechanism
30 roll open/close support shaft
31 roll open/close cylinder
32 husking roll bearing shaft
34 large diameter pulley
35 seat unit
36 bearing unit
37 husking roll bearing shaft
39 small diameter pulley
40 grain collection gutter
41 grain collection gutter
42 buffer plate 43 suction port
44 suction pipe
45 flow-down passage
46 winnowing passage
47 equal divider
48a rectification plate
48b rectification plate
49 milled item discharge passage
50 rice husk discharge passage
51 suction air passage
52 drive motor
53 motor pulley
54 relay pulley
55 V-belt
56 V-belt
57 relay pulley
58 feeding roll pulley
59 V-belt
60 tension pulley
61 air cylinder
62 vibration sensor
63 vibration sensor
64 abnormality determination means
65 alarm means
66 stoppage means

The invention claimed is:

1. A husking roll abnormality determination device of a husker, the husking roll abnormality determination device including:
　a vibration sensor; and
　an abnormality determination means,
　wherein the vibration sensor is provided on at least either of bearing units of a main shaft and an auxiliary shaft of the husker, and the vibration sensor detects vibrations occurring due to a husking action by a pair of husking rolls, wherein the husker includes the pair of husking rolls, wherein one of the pair of husking rolls is attached to the main shaft and the other of the pair of husking rolls is attached to the auxiliary shaft movable to be close to and away from the main shaft, and
　wherein the abnormality determination means determines that the pair of husking rolls fail to work normally when vibrations having a preset intensity or an intensity larger than the preset intensity are successively detected by the vibration sensor until a certain time elapses, the certain time corresponding to a period of time from a start of a husking action to disappearance of distortion on a surface of the pair of husking rolls.

2. The husking roll abnormality determination device of the husker according to claim 1, wherein the certain time corresponding to the period of time until the disappearance of the distortion on the surface of the pair of husking rolls is set to 60 to 180 minutes.

3. A husker comprising the husking roll abnormality determination device according to claim 1,
　wherein the husker includes the pair of husking rolls, wherein the one of the pair of husking rolls is attached to the main shaft and the other of the pair of husking rolls is attached to the auxiliary shaft movable to be close to and away from the main shaft, and
　wherein the vibration sensor is provided on at least either of the bearing units of the main shaft and the auxiliary shaft, and the vibration sensor being configured to detect vibrations occurring due to the husking action by the pair of husking rolls.

4. A husker comprising the husking roll abnormality determination device according to claim 2,
　wherein the husker includes the pair of husking rolls, wherein the one of the pair of husking rolls is attached to the main shaft and the other of the pair of husking rolls is attached to the auxiliary shaft movable to be close to and away from the main shaft, and
　wherein the vibration sensor is provided on at least either of the bearing units of the main shaft and the auxiliary shaft, and the vibration sensor being configured to detect vibrations occurring due to the husking action by the pair of husking rolls.

5. The husker according to claim 3, further comprising:
　forced stoppage means that forcibly terminates husking work when the abnormality determination means of the husking roll abnormality determination device determines that the pair of husking rolls fail to work normally.

6. The husker according to claim 4, further comprising:
　forced stoppage means that forcibly terminates husking work when the abnormality determination means of the husking roll abnormality determination device determines that the pair of husking rolls fail to work normally.

* * * * *